United States Patent [19]

Ichinoi et al.

[11] Patent Number: 4,723,175

[45] Date of Patent: Feb. 2, 1988

[54] VIDEO SIGNAL REPRODUCING APPARATUS FOR REPRODUCING RECORDED VIDEO SIGNAL FROM A MAGNETIC RECORDING MEDIUM

[75] Inventors: Yutaka Ichinoi, Yokohama; Yoshihiko Ota, Yokosuka, both of Japan

[73] Assignee: Victor Company of Japan, Ltd., Yokohama, Japan

[21] Appl. No.: 885,914

[22] Filed: Jul. 15, 1986

[30] Foreign Application Priority Data

Jul. 23, 1985 [JP] Japan .................................. 60-162353

[51] Int. Cl.⁴ ............................................. H04N 9/79
[52] U.S. Cl. ...................... 358/316; 358/27; 358/31; 358/330
[58] Field of Search ............... 358/316, 318, 330, 27, 358/28, 35, 36, 31

[56] References Cited

U.S. PATENT DOCUMENTS

| | | | |
|---|---|---|---|
| 3,949,414 | 4/1976 | Hayashi | 358/316 |
| 4,068,257 | 1/1978 | Hirota et al. | 358/316 |
| 4,356,506 | 10/1982 | Yamamitsu | 358/316 |
| 4,384,302 | 5/1983 | Schwarz | 358/27 |
| 4,549,225 | 10/1985 | Watanabe | 358/316 |

Primary Examiner—Donald McElheny, Jr.
Attorney, Agent, or Firm—Ladas & Parry

[57] ABSTRACT

A video signal reproducing apparatus for reproducing a recorded video signal from a magnetic recording medium comprises a reproducing circuit for reproducing a recorded frequency division multiplexed signal of an angle modulated luminance signal and a frequency converted carrier chrominance signal which has been frequency-converted into a low frequency band, a demodulating circuit for obtaining a reproduced luminance signal, a filter circuit for filtering a specific frequency component within the reproduced luminance signal, a level detecting circuit for detecting an output signal level of the filter circuit, a frequency converter circuit for obtaining a reproduced carrier chrominance signal, and a level controlling circuit for controlling the level of the reproduced carrier chrominance signal based on an output detection signal of the level detecting circuit.

6 Claims, 10 Drawing Figures

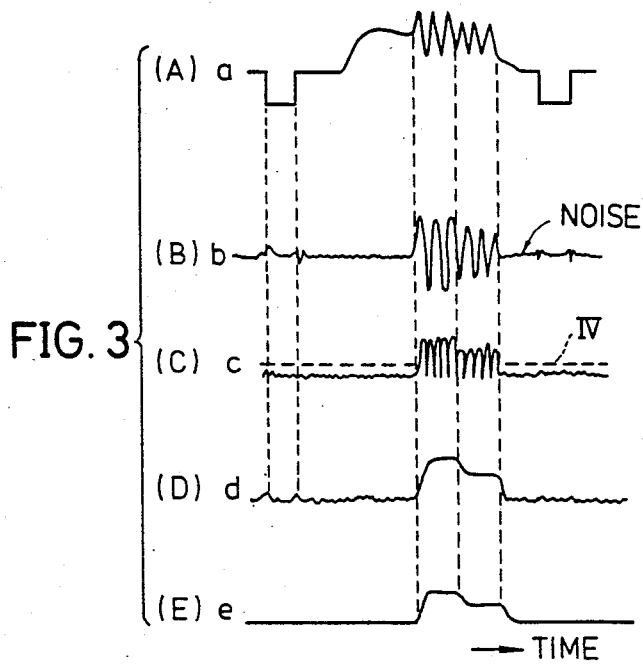
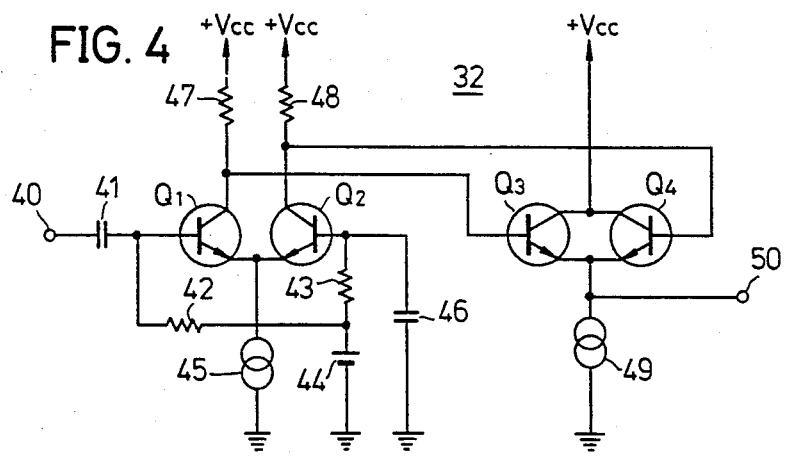
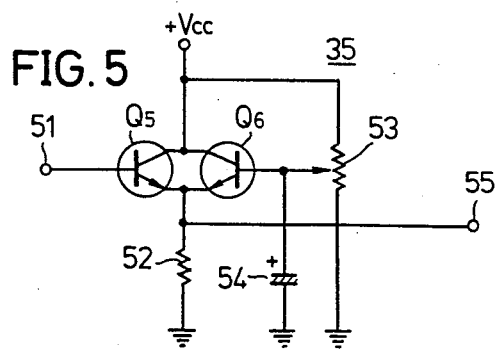

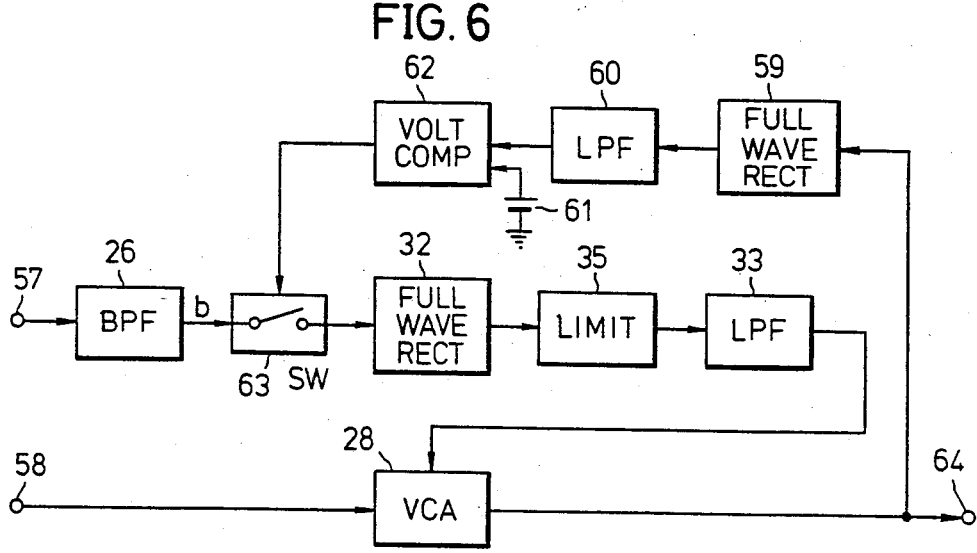
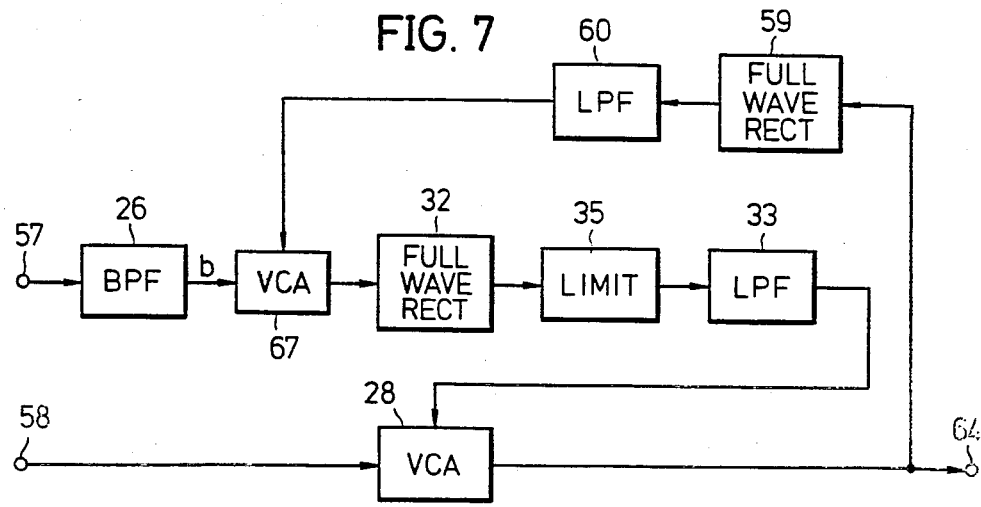

VIDEO SIGNAL REPRODUCING APPARATUS FOR REPRODUCING RECORDED VIDEO SIGNAL FROM A MAGNETIC RECORDING MEDIUM

BACKGROUND OF THE INVENTION

The present invention generally relates to video signal reproducing apparatuses for reproducing a recorded video signal from a magnetic recording medium, and more particularly to a video signal reproducing apparatus for reproducing a recorded frequency division multiplexed signal of a frequency modulated luminance signal and a frequency converted carrier chrominance signal from a magnetic recording medium such as a magnetic tape and for obtaining a reproduced color video signal in an original frequency band by performing a multiplexing after a frequency demodulation and a frequency conversion.

For example, a helical scan type video tape recorder (VTR) which employs the low-band conversion color recording and reproducing system is conventionally known as a recording and reproducing apparatus which records and reproduces a frequency division multiplexed signal. According to such a VTR, a color video signal applied to an input terminal is separated into a carrier chrominance signal and a luminance signal in a filter circuit. The separated luminance signal is supplied to a non-linear emphasis circuit which has a non-linear emphasis characteristic and emphasizes the luminance signal with smaller emphasis for larger amplitudes, and is thereafter supplied to a main emphasis circuit which emphasizes a high frequency component with a constant emphasis regardless of the amplitude. An output luminance signal of the main emphasis circuit is supplied to a clipping circuit which clips overshoot and undershoot portions which would cause overmodulation in a frequency modulator which is provided in a subsequent stage. An output luminance signal of the clipping circuit is supplied to the frequency modulator and is modulated into a frequency modulated (FM) luminance signal. The FM luminance signal is passed through a highpass filter wherein a low frequency component is sufficiently attenuated, and is supplied to a first adder.

On the other hand, the separated carrier chrominance signal is frequency-converted into a low frequency band in a carrier chrominance signal processing circuit. An output frequency converted carrier chrominance signal of the carrier chrominance signal processing circuit is passed through a lowpass filter and is supplied to the first adder. In the first adder, the frequency converted carrier chrominance signal is frequency-division-multiplexed with the FM luminance signal into the unoccupied low frequency band of the FM luminance signal. An output frequency division multiplexed signal of the first adder is passed through a recording amplifier and is supplied to rotary heads which successively record the frequency division multiplexed signal on tracks formed obliquely to the longitudinal direction of the magnetic tape.

At the time of the reproduction, the recorded frequency division multiplexed signal on the magnetic tape is reproduced by the rotary heads and is supplied to a filter circuit wherein the reproduced frequency division multiplexed signal is separated into a reproduced FM luminance signal and a reproduced frequency converted carrier chrominance signal. The reproduced FM luminance signal is passed through an equalizer and a limiter and is supplied to a frequency demodulator. An output reproduced luminance signal of the frequency demodulator is passed through a lowpass filter, a noise cancelling circuit which uses correlation in the horizontal scanning lines to cancel noise, a main de-emphasis circuit and a non-linear de-emphasis circuit, and is supplied to a second adder. The reproduced frequency converted carrier chrominance signal is converted into a reproduced carrier chrominance signal in the original frequency band in a frequency converter. The reproduced carrier chrominance signal is passed through a bandpass filter wherein an unwanted frequency component is eliminated, and is supplied to the second adder. Hence, a reproduced color video signal in which the reproduced luminance signal and the reproduced carrier chrominance signal are multiplexed is obtained from the second adder.

In the VTR described heretofore, the large amplitude portion of the luminance signal is clipped by the clipping circuit provided in the luminance signal recording system, and a second order distortion is introduced. In other words, when it is assumed that the luminance signal has a frequency f, a second order distortion having a frequency 2f is generated by the clipping performed in the clipping circuit. When the luminance signal having the second order distortion 2f frequency-modulates an FM carrier having a frequency fc in the frequency modulator, a first lower side band (fc-2f) is generated in the frequency spectrum of the output FM luminance signal of the frequency modulator due to the second order distortion 2f. In the case where the frequency f is 1.5 MHz to 2 MHz and the carrier frequency fc is 4 MHz, for example, the first lower side band (fc-2f) is generated at a frequency position in a vicinity of 0 to 1 MHz which is within the frequency band of 629 kHz±500 kHz of the frequency converted carrier chrominance signal. When the recording and reproduction are carried out with the first lower side band (fc-2f) mixed within the frequency converted carrier chrominance signal, the so-called cross-color phenomenon occurs and the picture quality of the reproduced picture becomes poor. In other words, a detailed portion of the picture will have a color which originally does not exist in the detailed portion of the picture.

Accordingly, in order to reduce the cross-color, the frequency characteristic of the highpass filter provided in the luminance signal recording system is conventionally selected to such a characteristic that the FM luminance signal is greatly attenuated within the frequency band of the frequency converted carrier chrominance signal. As a result, the frequency component (fc-2f) is sufficiently attenuated.

However, when the frequency characteristic of the highpass filter provided in the luminance signal recording system is selected to such a characteristic, the low frequency component of the FM luminance signal is also attenuated by the same highpass filter. For this reason, even the required frequency band of the luminance signal is slightly attenuated, and this resulted in the deterioration of the resolution of the picture. Moreover, even when the recording is carried out by suppressing the frequency component (fc-2f), it has been confirmed experimentally that the frequency component (fc-2f) is generated in the reproduced signal during the magnetic recording and reproducing process, but no measure is conventionally available for eliminating the frequency component (fc-2f) generated in the reproduced signal during the magnetic recording and reproducing process.

SUMMARY OF THE INVENTION

Accordingly, it is a general object of the present invention to provide a novel and useful reproducing apparatus for reproducing a recorded video signal from a magnetic recording medium, in which the problems described heretofore are eliminated.

Another and more specific object of the present invention is to provide a video signal reproducing apparatus which comprises a demodulator for demodulating an angle modulated luminance signal within a frequency division multiplexed signal reproduced from a magnetic recording medium, a filter circuit for filtering a specific frequency component within the reproduced luminance signal from the demodulator, a level detecting circuit for detecting an output signal level of the filter circuit, a frequency converter for obtaining a reproduced carrier chrominance signal from a frequency converted carrier chrominance signal within the reproduced frequency division multiplexed signal, and a level controlling circuit for controlling the level of the reproduced carrier chrominance signal based on an output level detection signal of the level detecting circuit. According to the video signal reproducing apparatus of the present invention, it is possible to make the cross-color visually inconspicuous by attenuating the level of the reproduced carrier chrominance signal when there is a large frequency component in a specific frequency band of the reproduced luminance signal which generates the cross-color.

Still another object of the present invention is to provide a video signal reproducing apparatus in which the level detecting circuit is designed to stop a level controlling operation for reducing the cross-color or reduces the level controlling quantity approximately inversely proportional to the level of the reproduced carrier chrominance signal when the level of the reproduced carrier chrominance signal is over a predetermined level. According to the video signal reproducing apparatus of the present invention, it is possible to prevent the level of the reproduced carrier chrominance signal to change unnecessarily and generate moire due to the frequency component of a frequency which is twice the chrominance subcarrier frequency of the frequency converted carrier chrominance signal, and prevent the signal-to-noise (S/N) ratio of the reproduced carrier chrominance signal from becoming deteriorated. In addition, it is unnecessary to provide a trap circuit which is conventionally required within the filter circuit of the luminance signal recording system for the purpose of reducing the cross-color. As a result, the construction of the filter circuit can be simplified, and it is possible to improve the resolution of the reproduced picture.

A further object of the present invention is to provide a video signal reproducing apparatus which further comprises an adder for adding the present reproduced luminance signal from the demodulator with the reproduced luminance signal of one horizontal scanning period before, and for supplying an added signal to the filter circuit. According to the video signal reproducing apparatus of the present invention, the frequency component which has twice the chrominance subcarrier frequency of the frequency converted carrier chrominance signal and causes the moire is frequency-selected so that the phase thereof is inverted for every one horizontal scanning period. For this reason, it is possible to further reduce the undesirable effects of the moire, and it is possible to obtain a reproduced color video signal of an extremely high quality compared to the conventional apparatus.

Other objects and further features of the present invention will be apparent from the following detailed description when read in conjunction with the accompanying drawings.

BRIEF DESCRIPTION OF THE DRAWINGS

FIGS. 3(A) through 3(E) show signal waveforms for explaining the operation of the block systems shown in FIGS. 2A and 2B;

FIG. 4 is a circuit diagram showing an example of a full-wave rectifying circuit within the block systems shown in FIGS. 2A and 2B;

FIG. 5 is a circuit diagram showing an example of a limiter within the block system shown in FIG. 2B;

FIG. 6 is a system block diagram showing an essential part of a second embodiment of the video signal reproducing apparatus according to the present invention;

FIG. 7 is a system block diagram showing an essential part of a third embodiment of the video signal reproducing apparatus according to the present invention;

DETAILED DESCRIPTION

Figure 1:
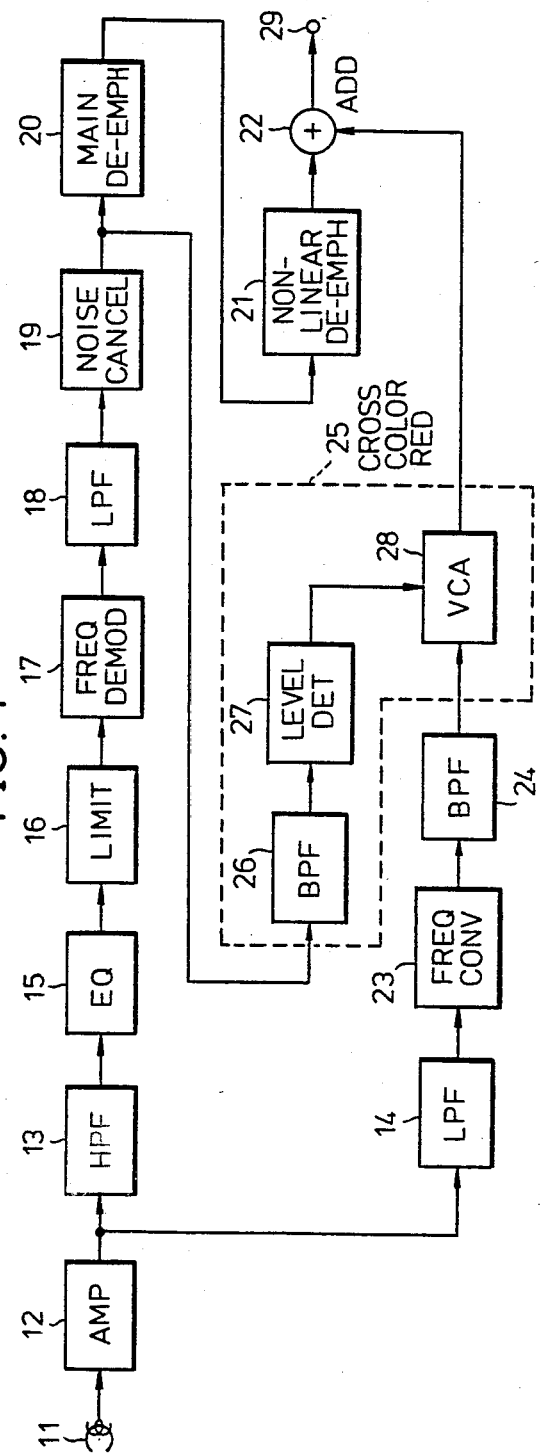
FIG. 1 is a system block diagram showing a first embodiment of the video signal reproducing apparatus according to the present invention.

In FIG. 1, a rotary head 11 of a helical scan type VTR reproduces from a magnetic tape (not shown) a recorded frequency division multiplexed signal of a frequency modulated (FM) luminance signal and a frequency converted carrier chrominance signal which has been frequency-converted into a low frequency band which is lower than a frequency band occupied by the FM luminance signal. The reproduced frequency division multiplexed signal from the rotary head 11 is passed through a pre-amplifier 12 and is supplied to a highpass filter 13 and a lowpass filter 14. The highpass filter 13 separates a reproduced FM luminance signal from the reproduced frequency division multiplexed signal. The reproduced FM luminance signal is passed through an equalizer 15 and a limiter 16, and is supplied to a frequency demodulator 17. An output reproduced luminance signal of the frequency demodulator 17 is passed through a lowpass filter 18, a noise cancelling circuit 19 which uses the correlation in the horizontal scanning lines to cancel the noise, a main de-emphasis circuit 20 and a non-linear de-emphasis circuit 21, and is supplied to an adder 22 as a reproduced luminance signal. On the other hand, the lowpass filter 14 separates the frequency converted carrier chrominance signal from the reproduced frequency division multiplexed signal. The reproduced frequency converted carrier chrominance signal is supplied to a frequency converter 23 and is converted into a reproduced carrier chrominance signal which is restored back into the original frequency band. The reproduced carrier chrominance signal is supplied to a bandpass filter 24 wherein an unwanted frequency component is eliminated, and an output signal of the bandpass filter 24 is supplied to a voltage controlled amplifier (VCA) 28 within a cross-color reducing circuit 25.

Figure 9:
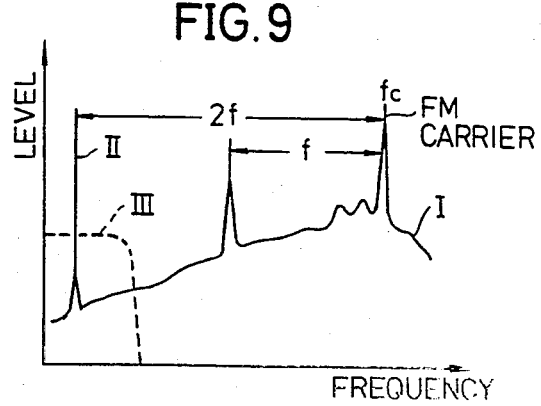
FIG. 9 is a graph showing a frequency spectrum for explaining the generation of a beat distortion which is to be suppressed in the video signal reproducing apparatus according to the present invention.

The cross-color reducing circuit 25 comprises a bandpass filter 26, a level detecting circuit 27 and the VCA 28. When it is assumed that the recorded luminance signal has a frequency f, a second order distortion of a frequency 2f is generated as a result of a clipping operation performed in a clipping circuit provided in the recording system. When the luminance signal having the second order distortion 2f frequency-modulates an FM carrier fc, the frequency spectrum of the output FM luminance signal of the frequency modulator provided in the recording system becomes as indicated by a solid line I in FIG. 9, and a first lower side band (fc-2f) is generated as indicated by II due to the second order distortion 2f. In the case where the frequency f is 1.5 MHz to 2 MHz and the carrier frequency fc is 4 MHz, for example, the first lower side band (fc-2f) is generated at a frequency position in a vicinity of 0 to 1 MHz which is within the frequency band of 629 kHz±500 kHz of the frequency converted carrier chrominance signal. When the recording and reproduction are carried out with the first lower side band (fc-2f) mixed within the frequency converted carrier chrominance signal, the so-called cross-color phenomenon occurs and the picture quality of the reproduced picture becomes poor. In other words, as described before, a detailed portion of the picture will have a color which originally does not exist in the detailed portion of the picture.

The amplitude versus frequency characteristic of the bandpass filter 26 is selected to a characteristic so as to pass the frequency component f (for example, 1.5 MHz to 2 MHz) that would result in the mixing of the frequency component (fc-2f) into the frequency band of the frequency converted carrier chrominance signal. The pass band of the bandpass filter 26 may be selected to 1.5 MHz to 2.5 MHz, for example, so as to pass frequency components including the frequency component (fc-2f) which folds about the zero frequency and mixes into the frequency band of the frequency converted carrier chrominance signal. The reproduced luminance signal obtained from the noise cancelling circuit 19 is supplied to the level detecting circuit 27 through the bandpass filter 26, and is converted into a frequency component 2f having two times the frequency of the frequency component f.

Figure 2A:
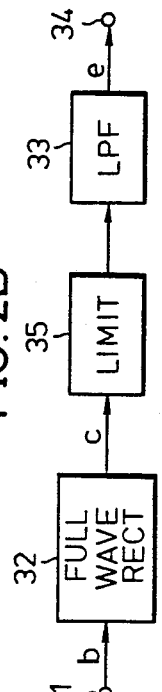
FIGS. 2A and 2B are system block diagrams respectively showing an embodiment of a level detecting circuit within the block system shown in FIG. 1.

FIG. 2A shows a first embodiment of the level detecting circuit 27. The output signal of the bandpass filter 26 applied to an input terminal 31 is supplied to a full-wave rectifying circuit 32. The signal supplied to the full-wave rectifying circuit 32 is subjected to a full-wave rectification and is converted into a signal having a waveform including a large frequency component 2f. The output signal of the full-wave rectifying circuit 32 is supplied to a lowpass filter 33 which attenuates the high frequency component over 3f. Accordingly, in the case where the reproduced luminance signal has a waveform a shown in FIG. 3(A) and a signal b shown in FIG. 3(B) is obtained from the bandpass filter 26, a full-wave rectified signal c shown in FIG. 3(C) is obtained from the full-wave rectifying circuit 32. Thus, a frequency component 2f having a waveform d shown in FIG. 3(D) is obtained from the lowpass filter 33 and is supplied to an output terminal 34.

A known full-wave rectifying circuit shown in FIG. 4 may be used for the full-wave rectifying circuit 32. In FIG. 4, the signal b shown in FIG. 3(B) is applied to an input terminal 40 and is supplied to the base of an NPN transistor Q1 via a coupling capacitor 41. The base of the transistor Q1 is base biased by a D.C. voltage from a D.C. voltage source 44 via a resistor 42, and the base of an NPN transistor Q2 is base biased by the D.C. voltage via a resistor 43. The emitters of the transistors Q1 and Q2 are commonly connected to a constant current source 45. Load resistors 47 and 48 are connected to the respective collectors of the transistors Q1 and Q2. In addition, the base of the transistor Q2 is grounded via a capacitor 46.

Accordingly, during the positive half cycle of the signal b, the signal b is amplified and is obtained with an inverted phase from the collector of the transistor Q1. On the other hand, the base of the transistor Q2 is short-circuited by the capacitor 46 (in terms of A.C.) and the signal b is not supplied thereto. Hence, the positive half cycle of a signal having the same phase as the signal b is obtained from the collector of the transistor Q2.

Hence, the negative half cycle of the signal from the collector of the transistor Q1 is supplied to the base of an NPN transistor Q3. On the other hand, the positive half cycle of the signal from the collector of the transistor Q2 is supplied to the base of an NPN transistor Q4. The emitters of the transistors Q3 and Q4 are commonly connected to a constant current source 49. Since the base potential of the transistor Q3 is lower than the base potential of the transistor Q4, the transistor Q3 is turned OFF and the transistor Q4 is turned ON. Consequently, the positive half cycle of a signal which is in phase with the signal b is obtained from a common connection point of the transistors Q3 and Q4 and the constant current source 49 and is supplied to an output terminal 50.

During the negative half cycle of the signal b, the positive half cycle of a signal is obtained from the collector of the transistor Q1 and the negative half cycle of a signal is obtained from the collector of the transistor Q2. As a result, the transistor Q3 is turned ON and the transistor Q4 is turned OFF, and the positive half cycle of a signal which has the inverted phase of the signal b is supplied to the output terminal 50. Therefore, the full-wave rectified signal c shown in FIG. 3(C) is obtained from the output terminal 50.

Because noise is included in the reproduced luminance signal, noise in the pass band of the bandpass filter 26 is included in the output signal b of the bandpass filter 26 even in a time period in which there is no signal within the pass band. Hence, when the level detecting circuit shown in FIG.2A is used as the level detecting circuit 27, a noise component is included in the output level detection signal d of the level detecting circuit 27 as shown in FIG. 3(D).

In the present embodiment of the video signal reproducing apparatus, the level of the reproduced carrier chrominance signal is varied in the VCA 28 by use of the output level detection signal of the level detecting circuit 27, as will be described later on in the present specification. For this reason, when the noise component is included in the output level detection signal of the level detecting circuit 27, color noise may be generated when the level of the reproduced carrier chrominance signal is controlled by use of the level detection signal including the noise component.

Figure 2B:
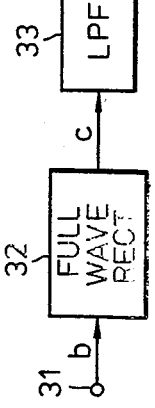

In the case where such color noise may become a problem, a second embodiment of the level detecting circuit shown in FIG. 2B may be used as the level detecting circuit 27. In FIG. 2B, those parts which are the same as those corresponding parts in FIG. 2A are designated by the same reference numerals, and description thereof will be omitted. The present embodiment of the level detecting circuit is characterized in that a limiter 35 is provided between the full-wave rectifying circuit 32 and the lowpass filter 33.

A known limiter shown in FIG. 5 may be used for the limiter 35. In FIG. 5, the full-wave rectified signal c is applied to an input terminal 51 and is supplied to the base of an NPN transistor Q5. The emitter of the transistor Q5 and the emitter of an NPN transistor Q6 are commonly grounded via a resistor 52. A constant D.C. voltage indicated by a phantom line IV in FIG. 3(C) is supplied to the base of the transistor Q6 by a variable resistor 53 and a capacitor 54.

Accordingly, when the full-wave rectified signal c is over the constant D.C voltage IV, the transistor Q5 is turned ON and the full-wave rectified signal c is supplied to an output terminal 55 from the emitter of the transistor Q5. On the other hand, when the full-wave rectified signal c is under the constant D.C. voltage IV, the transistor Q5 is turned OFF and a constant voltage is supplied to the output terminal 55. Thus, a level detection signal e shown in FIG. 3(E) which has been eliminated of the noise component is obtained at the output terminal 34 of the level detecting circuit shown in FIG. 2B. It is possible to provide the limiter 35 at the output end of the lowpass filter 33.

The level detection signal d or e obtained from the level detecting circuit 27 is supplied to the VCA 28 as a control voltage for variably controlling the gain thereof. For example, a differential amplifier circuit of the double balanced connection type may be used for the VCA 28, and the gain is decreased as the control voltage is decreased, for example. Accordingly, in the case of the VCA 28 having such a construction, an inverted signal $\bar{d}$ (or $\bar{e}$) of the level detection signal d (or e) is supplied to the VCA 28 as the control voltage. As a result, the VCA 28 controls the level of the reproduced carrier chrominance signal from the bandpass filter 24 so that the level becomes smaller as the output signal level of the bandpass filter 26 becomes larger. The reproduced carrier chrominance signal which has been controlled of the level in the VCA 28 is supplied to the adder 22.

The adder 22 adds the reproduced carrier chrominance signal from the VCA 28 and the reproduced luminance signal from the non-linear de-emphasis circuit 21, and produces a reproduced color video signal. The reproduced color video signal is supplied to an output terminal 29.

Therefore, when there is a large specific frequency component f of the reproduced luminance signal that would generate the cross-color, the level of the reproduced carrier chrominance signal is made small. Hence, the color saturation in the reproduced picture is made small, so that the cross-color becomes visually inconspicuous.

The input signal of the bandpass filter 26 is not limited to that of the embodiment. The input signal of the bandpass filter 26 may be obtained from the output end of any one of the frequency demodulator 17, the lowpass filter 18, the main de-emphasis circuit 20 and the non-linear de-emphasis circuit 21.

In the VTR which employs the low-band conversion color recording and reproducing system, it is known that a distortion component (fc-2fs) is generated and an unwanted component 2fs which causes the so-called moire is generated when this distortion component is frequency-demodulated in the luminance signal reproducing system, where fs denotes the chrominance subcarrier frequency of the frequency converted carrier chrominance signal. When it is assumed that the chrominance subcarrier frequency fs is 629 kHz which is forty times the horizontal scanning frequency, the frequency of the unwanted component 2fs is 1.258 MHz which is close to the lower limit frequency (1.5 MHz) of the pass band of the bandpass filter 26. For this reason, a portion of the unwanted component 2fs slightly passes the bandpass filter 26. Therefore, when the unwanted component 2fs which causes the moire is large, the control voltage is affected by this large unwanted component 2fs and the level of the output reproduced carrier chrominance signal of the VCA 28 changes unnecessarily and the S/N ratio of the reproduced carrier chrominance signal is deteriorated.

Embodiments which will be described hereinafter eliminate the undesirable phenomenon caused by the unwanted component 2fs. FIG. 6 shows the essential part of a second embodiment of the video signal reproducing apparatus according to the present invention. In FIG. 6, those parts which are the same as those corresponding parts in FIGS. 1, 2A and 2B are designated by the same reference numerals.

In FIG. 6, the reproduced luminance signal from the noise cancelling circuit 19, for example, is applied to an input terminal 57. The VCA 28 controls the level of the reproduced carrier chrominance signal from an input terminal 58 and supplies an output signal thereof to an output terminal 64. The output signal of the VCA 28 is also passed through a full-wave rectifying circuit 59 and a lowpass filter 60 so as to obtain a level detection signal of the reproduced carrier chrominance signal according to the same principle as that described before in conjunction with FIG. 2A. A voltage comparator 62 compares the level detection signal and a predetermined reference voltage from a reference voltage source 61, and produces a binary signal having logic values depending on whether the level detection signal is greater than or smaller than the predetermined reference voltage. The output signal of the voltage comparator 62 is supplied to a switching circuit 63 as a switching signal.

The switching circuit 63 is turned OFF by the switching signal during a time period in which the level detection signal is greater than the predetermined reference voltage, and is turned ON by the switching signal during other time periods. Accordingly, the output signal of the bandpass filter 26 is supplied to the full-wave rectifying circuit 32 via the switching circuit 63 so that the level control operation described before is performed to make the cross-color visually inconspicuous only when the level detection signal of the reproduced carrier chrominance signal is smaller than the predetermined reference voltage.

On the other hand, when the level detection signal of the reproduced carrier chrominance signal is greater than the predetermined reference voltage, the switching circuit 63 is turned OFF and the control voltage supplied to the VCA 28 is constant. As a result, the level control operation is stopped. Therefore, it is possible to prevent a large portion of the unwanted component 2fs which causes the moire from passing through the bandpass filter 26. In other words, it is possible to prevent the phenomenon in which the level of the output reproduced carrier chrominance signal of the VCA 28 changes unnecessarily and the S/N ratio of the reproduced carrier chrominance signal becomes deteriorated.

According to the present embodiment, the switching circuit 63 is turned OFF when the color saturation of the reproduced carrier chrominance signal is over a predetermined value, and the cross-color reducing operation is not performed. However, it is very rare that the color picture has a large luminance signal component which causes the cross-color and also has a color saturation which is over the predetermined value. Further, in the case where the color saturation is large originally, the cross-color is not as conspicuous as in the case where the color saturation is small originally. Accordingly, no problems are introduced from the practical point of view although the cross-color reducing operation is not performed when the color saturation of the reproduced carrier chrominance signal is over the predetermined value.

According the embodiment shown in FIG. 6, there is an advantage in that it is unlikely that the color saturation will be discriminated as being large due to the large cross-color component, because the level of the output reproduced carrier chrominance signal of the VCA 28 is detected. However, in the case where the cross-color component is sufficiently small compared to the level of the reproduced carrier chrominance signal at the time when the color saturation is large and the problem described before does not occur, it is possible to supply to the full-wave rectifying circuit 59 the input reproduced carrier chrominance signal of the VCA 28 instead of the output reproduced carrier chrominance signal of the VCA 28. In addition, the switching circuit 63 may be provided at any position in the transmission path from the output end of the bandpass filter 26 to the control voltage input terminal of the VCA 28.

FIG. 7 shows the essential part of a third embodiment of the video signal reproducing apparatus according to the present invention. In FIG. 7, those parts which are the same as those corresponding parts in FIG. 6 are designated by the same reference numerals, and description thereof will be omitted. In the second embodiment, the switching circuit 63 is turned ON and OFF depending on the result of the comparison between the level detection signal of the reproduced carrier chrominance signal and the predetermined reference voltage, so as to perform or stop the cross-color reducing operation. However, the present embodiment is characterized in that the level detection signal obtained from the lowpass filter 60 is supplied to a VCA 67 as a control voltage for variably controlling the gain thereof. The VCA 67 controls the level of the output signal of the bandpass filter 26 and supplies an output signal thereof to the full-wave rectifying circuit 32. The gain of the VCA 67 is controlled to become smaller as the level of the reproduced carrier chrominance signal becomes larger because the level of the level detection signal becomes larger. Hence, the level controlling quantity of the VCA 28 becomes smaller as the level of the reproduced carrier chrominance signal becomes larger (that is, as the color saturation becomes larger). Therefore, it is possible to prevent the S/N ratio of the reproduced carrier chrominance signal from becoming deteriorated by the unwanted component 2fs described before.

In most VTRs employing the low-band conversion color recording and reproducing system, in order to make the moire component visually inconspicuous in the reproduced picture, the chrominance subcarrier frequency fs of the frequency converted carrier chrominance signal is selected so that the phase of the unwanted component 2fs which causes the moire is inverted for every one horizontal scanning period. In such VTRs, it is possible to reduce the unwanted component 2fs by adding the present signal with the signal of one horizontal scanning period before.

Figure 8:
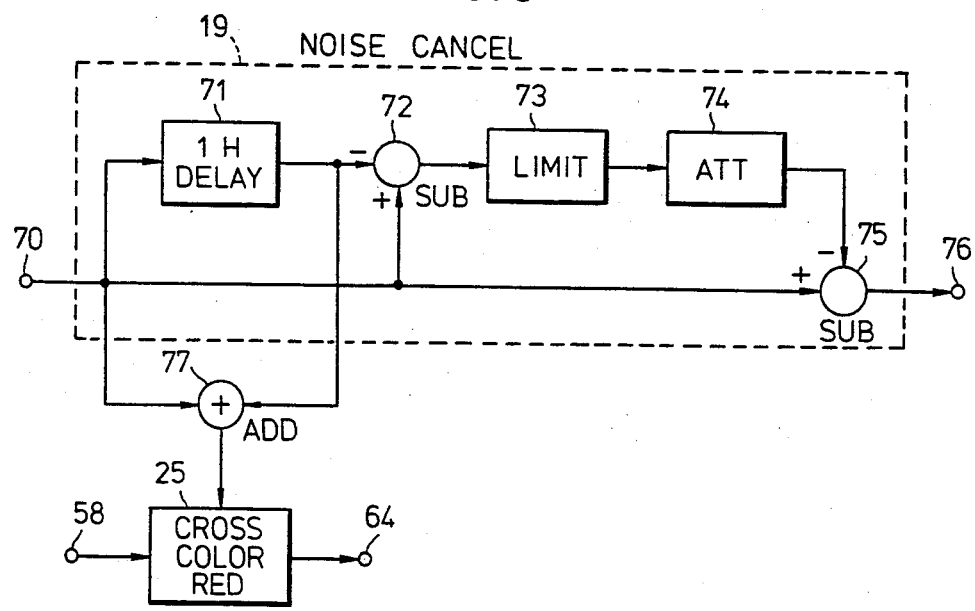
FIG. 8 is a system block diagram showing an essential part of a fourth embodiment of the video signal reproducing apparatus according to the present invention.

FIG. 8 shows the essential part of a fourth embodiment of the video signal reproducing apparatus according to the present invention. In FIG. 8, the noise cancelling circuit 19 comprising a one horizontal scanning period (1H) delay line 71, subtracting circuits 72 and 75, a limiter 73 and an attenuator 74 is known. The noise cancelling circuit 19 reduces the noise in the reproduced luminance signal from an input terminal 70 by using the correlation in the horizontal scanning lines, and supplies an output reproduced luminance signal to an output terminal 76. The circuit shown in FIG. 8 also has the effect of reducing the unwanted component 2fs described before. However, in the case where the unwanted component 2fs exceeds the limiting level of the limiter 73, the noise cancelling circuit 19 cannot sufficiently reduce the unwanted component 2fs.

In this case, the reproduced luminance signal of 1H before obtained from the 1H delay circuit 71 and the present reproduced luminance signal from the input terminal 70 are added in an adder 77, without passing the reproduced luminance signal through the limiter 72. An output added signal of the adder 77 is supplied to the bandpass filter 26 within the cross-color reducing circuit 25 so as to produce the control voltage for the VCA 28 within the cross-color reducing circuit 25. As a result, it is possible to further reduce the undesirable effects of the moire.

The present invention is not limited to the embodiments described heretofore, and may also be applied to an apparatus which reproduces a recorded video signal from a magnetic recording medium other than the magnetic tape, that is, from a magnetic disc, for example.

Further, the present invention is not limited to these embodiments, but various variations and modifications may be made without departing from the scope of the present invention.

What is claimed is:

1. A video signal reproducing apparatus for reproducing a recorded video signal from a magnetic recording medium, said video signal reproducing apparatus comprising:

reproducing means for reproducing from the magnetic recording medium a recorded frequency division multiplexed signal of an angle modulated luminance signal and a frequency converted carrier chrominance signal which has been frequency-converted into a frequency band lower than a frequency band occupied by the angle modulated luminance signal;

demodulating means for obtaining a reproduced luminance signal by separating the angle modulated luminance signal from the frequency division multiplexed signal reproduced by said reproducing means and demodulating the separated angle modulated luminance signal;

a filter circuit supplied with said reproduced luminance signal from said demodulating means for filtering a specific frequency component thereof so that a difference frequency component of a frequency component having twice a frequency of said reproduced luminance signal and a carrier frequency of the angle modulated luminance signal is positioned within the frequency band of the frequency converted carrier chrominance signal;

a level detecting circuit for producing a level detection signal by detecting an output signal level of said filter circuit;

frequency converting means for obtaining a reproduced carrier chrominance signal by separating the frequency converted carrier chrominance signal from the frequency division multiplexed signal reproduced by said reproducing means and frequency-converting the separated frequency converted carrier chrominance signal back to an original frequency band thereof; and level controlling means for controlling a level of said reproduced carrier chrominance signal based on the output level detection signal of said level detecting circuit so that the level of said reproduced carrier chrominance signal becomes smaller as the output signal level of said filter circuit becomes larger.

2. A video signal reproducing apparatus as claimed in claim 1 in which said level detecting circuit comprises a full-wave rectifying circuit for subjecting the output signal of said filter circuit to a full-wave rectification, and a lowpass filter for producing said level detection signal by attenuating a frequency component which is within an output signal of said full-wave rectifying circuit and has a frequency of over three times a frequency of said specific frequency component.

3. A video signal reproducing apparatus as claimed in claim 2 in which said level detecting circuit further comprises a limiter for passing an output signal of said full-wave rectifying circuit or said lowpass filter with a level thereof unchanged when the level thereof is greater than a predetermined level and for limiting the level to a certain level when the level is smaller than said predetermined level.

4. A video signal reproducing apparatus as claimed in claim 1 in which said level detecting circuit comprises a first full-wave rectifying circuit for subjecting said reproduced carrier chrominance signal obtained from said level controlling means to a full-wave rectification, a first lowpass filter for attenuating a frequency component which is within an output signal of said first full-wave rectifying circuit and has a frequency of over three times a frequency of said specific frequency component, a level comparator for comparing an output signal level of said first lowpass filter with a level of a predetermined reference signal, a second full-wave rectifying circuit for subjecting the output signal of said filter circuit to a full-wave rectification, a second lowpass filter provided at an output end of said second full-wave rectifying circuit for attenuating a frequency component which has a frequency of over three times the frequency of said specific frequency component, a limiter provided at an output end of either said second full-wave rectifying circuit or said second lowpass filter for passing an output signal of said second full-wave rectifying circuit or said second lowpass filter with a level thereof unchanged when the level thereof is greater than a predetermined level and for limiting the level to a certain level when the level is smaller than said predetermined level, and a switching circuit provided in a transmission path extending from an output end of said filter circuit to a level control signal input terminal of said level controlling means, said transmission path including said second full-wave rectifying circuit, said second lowpass filter and said limiter coupled in series, said switching circuit being controlled responsive to an output signal of said level comparator so that said switching circuit is turned OFF during a time period in which the output signal level of said first lowpass filter is greater than that of said predetermined reference signal and is turned ON during a time period in which the output signal level of said first lowpass filter is smaller than that of said predetermined reference signal.

5. A video signal reproducing apparatus as claimed in claim 1 in which said level detecting circuit comprises a first full-wave rectifying circuit for subjecting said reproduced carrier chrominance signal obtained from said level controlling means to a full-wave rectification, a first lowpass filter for attenuating a frequency component which is within an output signal of said first full-wave rectifying circuit and has a frequency of over three times a frequency of said specific frequency component, a voltage controlled amplifier for controlling an output signal level of said first lowpass filter, said voltage controlled amplifier having a gain thereof controlled so that the gain becomes smaller as the output signal level of said first lowpass filter becomes larger, a second full-wave rectifying circuit for subjecting an output signal of said voltage controlled amplifier to a full-wave rectification, a second lowpass filter provided at an output end of said second full-wave rectifying circuit for attenuating a frequency component which has a frequency of over three times the frequency of said specific frequency component, and a limiter provided at an output end of either said second full-wave rectifying circuit or said second lowpass filter for passing an output signal of said second full-wave rectifying circuit or said second lowpass filter with a level thereof unchanged when the level thereof is greater than a predetermined level and for limiting the level to a certain level when the level is smaller than said predetermined level, said output signal of said second lowpass filter or said limiter being produced as a level control signal for said level controlling means.

6. A video signal reproducing apparatus as claimed in claim 1 which further comprises a noise cancelling circuit supplied with said reproduced luminance signal from said demodulating means for reducing noise within said reproduced luminance signal by using a correlation of the luminance signal for every horizontal scanning period, said noise cancelling circuit comprising a delay circuit having a delay time of one horizontal scanning period, and an adder for producing an added signal by adding input and output reproduced luminance signals of said delay circuit and for supplying the added signal to said filter circuit.

* * * * *